C. LORENZEN.
AERIAL MACHINE.
APPLICATION FILED DEC. 27, 1909.

1,044,064.

Patented Nov. 12, 1912.
6 SHEETS—SHEET 1.

WITNESSES

INVENTOR
Christian Lorenzen
ATT'Y

C. LORENZEN.
AERIAL MACHINE.
APPLICATION FILED DEC. 27, 1909.

1,044,064.

Patented Nov. 12, 1912.
6 SHEETS—SHEET 4.

WITNESSES

INVENTOR
Christian Lorenzen.
BY

ATT'Y

C. LORENZEN.
AERIAL MACHINE.
APPLICATION FILED DEC. 27, 1909.

1,044,064.

Patented Nov. 12, 1912.

WITNESSES
W. P. Burke
John G. Percival

INVENTOR
Christian Lorenzen
By
Att'y.

UNITED STATES PATENT OFFICE.

CHRISTIAN LORENZEN, OF HARROW, ENGLAND.

AERIAL MACHINE.

1,044,064.  Specification of Letters Patent.   Patented Nov. 12, 1912.

Application filed December 27, 1909. Serial No. 535,103.

*To all whom it may concern:*

Be it known that I, CHRISTIAN LORENZEN, subject of the German Emperor, residing at "Woodstock," Marlboro Hill, Harrow, England, have invented new and useful Improvements in Aerial Machines, of which the following is a specification.

The present invention is for the improvement of aerial navigation by a machine of the type of a heavier than air apparatus embodying stability or mobility at command, together with dirigibility and safety, and a capability of rising vertically into the air from the ground.

A leading feature of novelty is in the employment of fan-like horizontal propellers which are of special construction and combine the functions of screw propellers working in air, gyroscopes, parachutes, and more or less aeroplanes. These propellers are lifting propellers; they are of wheel-like construction with numerous radial blades which are made of thin flexible plate. The construction is for avoiding the necessity of providing wires or guys outside the plane of the wheel after the manner of bicycle spokes forming a tensioning system diverging from the rim. Moreover, the flexible blades are provided with special means whereby a simultaneous adjustment of their pitch is effected by torsion.

According to the present invention, the said construction consists in the arrangement of a two-part inner or outer rim, whose parts are adapted to be adjusted apart, and the blades of a single fastening or hub rim: the blades are arranged between these rims as radial tensioning members in such a manner that the tips of the blades are alternately fastened to one and the other part of the rim and that by a relative adjustment of the rim-parts, the blades are compelled to assume by torsion the askew position or the horizontal position corresponding to the parachute action. In connection with this improved construction of the fan, the invention embodies an aerial machine of the preferred constructional form with two propellers of the described type superposed and carrying between them the frame. This system is completed by a steering mechanism, which allows of a peculiar simultaneous adjustment of the position of the blades for either propeller when steering, thus rectifying the desired position of the aerial machine. Furthermore, in the said biplanar construction of the aerial machine with two propellers, which are arranged one over the other and revolve in opposite directions, a gyroscopic steadying effect is insured by the difference of the masses or the rate of motion.

Referring to the accompanying drawings: Fig. 11 is a diagrammatic plan view and Figs. 12 and 13 (similar to Figs. 5 and 7) serve for showing a modification of the blade adjusting device, wherein the inner rim is the two part member and adapted to act for the torsion of the blades.

Figure 3:
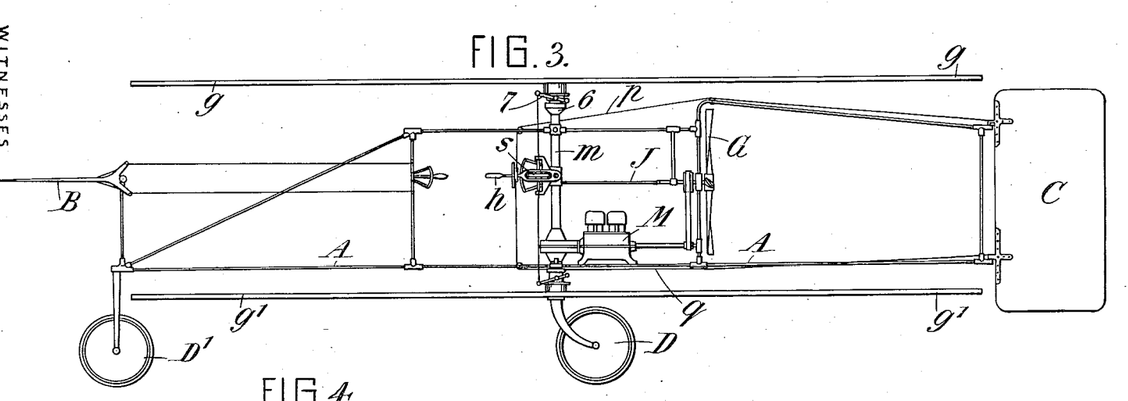
Fig. 3 is a side view of an aerial machine constructed with two oppositely driven fans of the novel type.

The preferred type of the aerial machine, to which my invention is applied, is that according to Fig. 3, wherein two fan-like propellers ($g$ $g'$) of the herein described kind are employed in superposition. The fan-like propellers $g$ and $g'$ revolve in opposite directions and are centered on the same axis, as their concentrically mounted shafts extend through the central pillar $m$ forming the main stay of the whole machine.

Figures 1, 2:
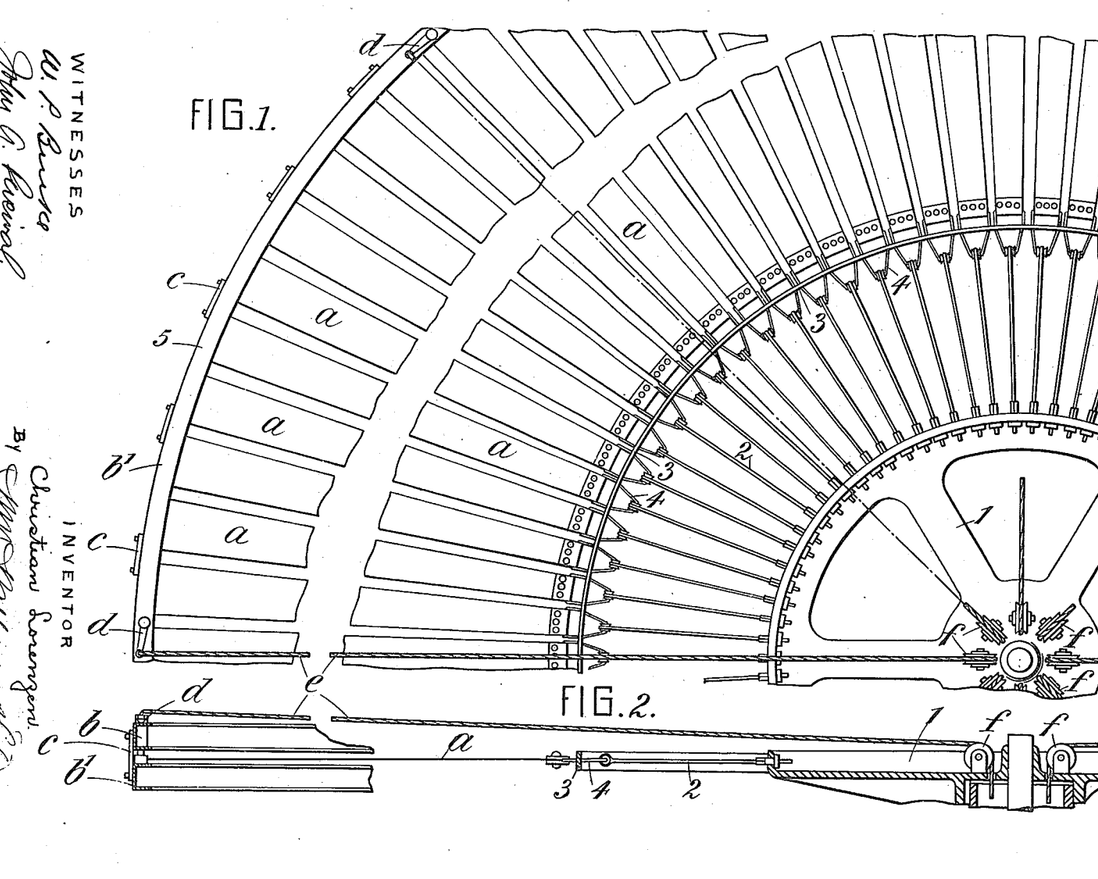
Figure 1 is a plan of a part of the wheel-like propeller or fan.
Fig. 2 is a sectional elevation of the fan of Fig. 1.

The construction of one of the fan wheels as embodying the invention will now be described with reference to Figs. 1 and 2 and the other detail views. The hub of the fan is designated 1; the spokes 2 extend from the said hub to an inner ring or rim 3 and terminate in fastening members 4. The outer rim is designated 5 but consists of two parts $b$ and $b'$. As shown in Fig. 2, these parts have a U-shaped cross section and are arranged one over the other. Instead of the U-shaped cross section, the twin or double rims may be made of steel in H, T or L section, a high resisting capacity being necessary, according as the propellers have a comparatively large diameter. The blades $a\ a\ a$... are arranged radially between the two rims 3 and 5 ($b\ b'$) and are fixed with their inner ends to the rim 3 by means of the aforesaid fastening members 4. The outer ends of the blades are secured with their tips alternately to the rim-parts $b$ and $b'$ respectively, as shown in Figs. 5-8 on a larger scale. The blades are tightly strained between the double outer rim and the inner rim forming a part of the central hub of the fan, and constitute per se the spoke-like tensioning means in substitution of any other stiffening members. The construction thus somewhat resembles on a large scale that of a bicycle but without the spokes diverging from the plane of the wheel. The evenness of the horizontal tension between the periphery and the hub keeps the circumferential rims truly circular, while at the working speed of revolution the centrifugal force of the substantial rims counterbalances the centripetal tension of the radial blades avoiding distortion and buckling of the peripheral rims.

Figure 5:
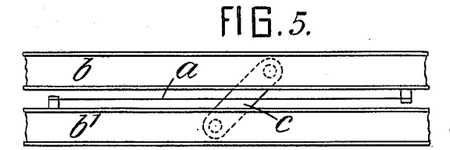
Figs. 5, 6 and 7 show in detail a constructional form of the blade adjusting means, wherein the two-part double (outer) rim is employed, as is also shown in Fig. 2.
Figure 6:
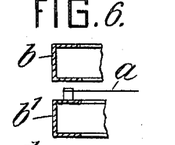
Figure 7:
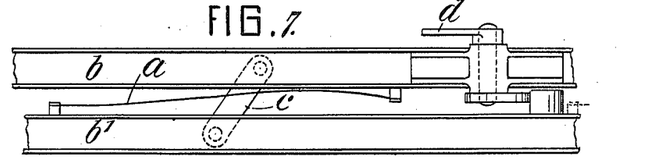
Figure 8:
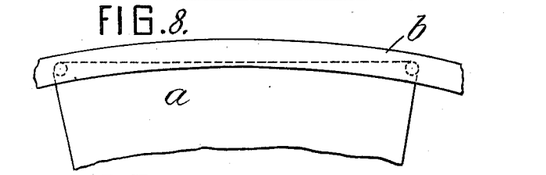
Fig. 8 shows the connection of the blade edge with the double rim.

The blades $a$ are adapted, irrespective of their tensioning capacity, to be helically distorted, so that they lie flat or may assume an inclined position. When at rest these blades lie flat, when inclined and rotated, they become propeller vanes. The distortion to a varying degree is effected by more or less bringing apart the rim-parts $b$ and $b'$, which are connected together at intervals by links $c, c, c$ (Figs. 1 and 2 and Figs. 5 and 7). It is shown in Figs. 5-7 how the outer extremities of the blades or vanes $a, a\ a$ are fixed, one corner of each vane to the upper ring $b$ and the other corner to the lower ring $b'$. When normally these two rings, which form the double rim, lie close together, all the numerous blades are held flat or nearly flat as in Fig. 2. Then this wheel-like apparatus can be revolved to simply act more or less as a gyroscope, aeroplane and parachute. However, there are crank arms (or the like) $d$, as shown in Figs. 1, 2 and 7, worked by cords $e, e, e, e$, led over guide pulleys $f, f, f, f$, to shifting means, which are provided on the hub or on the shaft ends of the fan; such means are represented in Fig. 3 by a shifting collar 6, with adjusting lever 7, the latter can be pulled and the apparatus can in an instant be converted into a fan-like or screw propeller endowed with great vertical lifting power, because, when the eccentrics or cams attached to crank arms $d$ cause the two rims $b\ b'$, of the double rim to separate as far as the links $c, c, c, c$ allow, then the surfaces of the fan-like blades become somewhat contorted in a way very effective for the object in view. Fig. 7 shows a crank arm $d$ with the eccentric on the upper ring working against a fixed stud or roller on the lower ring. As long as the radial blades lie flat, their points of fixture to the upper and lower rings $b\ b'$ are a certain distance apart, say, more or less about double the length of one of the links $c$. When the peripheral rings become slightly farther separated, then one corner of every vane is not only raised above the other corner, but the two corners are brought closer together, and thus a certain precise flexure of the thin radial blades is occasioned.

In Figs. 2, 5 and 6 the blades are lying flat. In Fig. 7 the rings $b\ b'$ are farther apart and accordingly the blade $a$ assumes a curved shape so as to conform more or less with the Lilienthal curve. The most suitable curvature which the blades must be made to assume comprises three tangential curves. At first there is a slight hollow or bow (the Lilienthal curved proper), then a descending incline with a pitch increasing to a maximum, but afterward diminishing and ending in the portion held comparatively flat by the rear point attached to the lower rim. The curve of the descending incline is much affected by the air resistance which it encounters when the blades are very flexible. On this account, sundry means, such as stiffening and strengthening bands, may be employed to make firm the exact theoretically required curves and inclines. It is the transverse compression which compels the front part of each radial blade to assume the "Lilienthal" curve or a curve formed with its front bow part sloping at a negative angle of incidence, by which formation the favorable effect is attained that the said bow first gives the air a motion in an opposite direction to that in which it is finally discharged.

As above described the blades would be normally flat and from this attitude they would be forced into their inclined working position. However the working could be managed in the opposite way, that is to say, the blades might have a normally fixed curvature and a normally inclined angle or propeller pitch. It would then be arranged that the said cords $e, e, e, e$ led over the guide pulleys $f, f, f, f$, would pull the crank arms $d$ so that the action would bring the rings $b$ and $b'$ of the double rim nearer together and thus the blades would be "feathered"

by being constrained into a flat or nearly flat attitude.

Figures 9, 10, 16, 17:
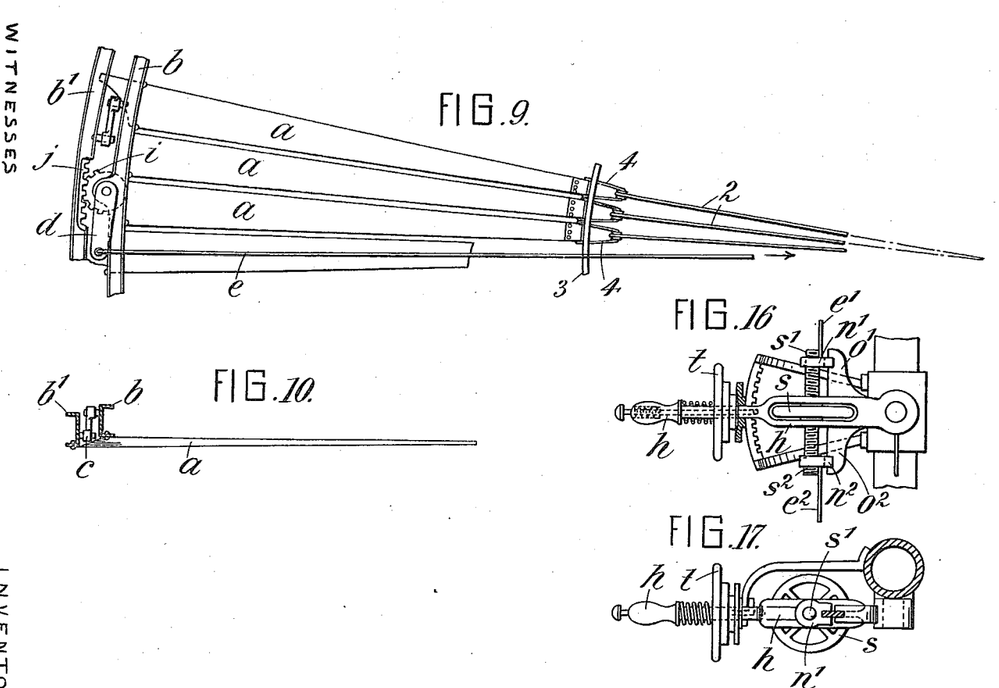
Figs. 9 and 10 are partial views (plan and section) showing a modification of the blade adjusting device as applied to the double outer rim.
Fig. 16 is an elevation and Fig. 17 is a plan of a combined controlling and steering gear, shown mounted upon the central pillar in Fig. 3.

In Figs. 9 and 10, a modification of the blade adjusting device is shown, wherein the rim parts $b$ $b'$ are arranged concentrically to each other instead of one above the other. Instead of the eccentric device (as shown in Fig. 7) a toothed gearing serves for the adjusting operation, the toothed gearing being composed of a rack segment $i$ which meshes with a rack $j$ on the one rim part and is controlled by a lever $d$ connected with the pulling member or cord $e$. The alternate connection of the tips of each blade is obvious from Figs. 9 and 10.

Figure 11:
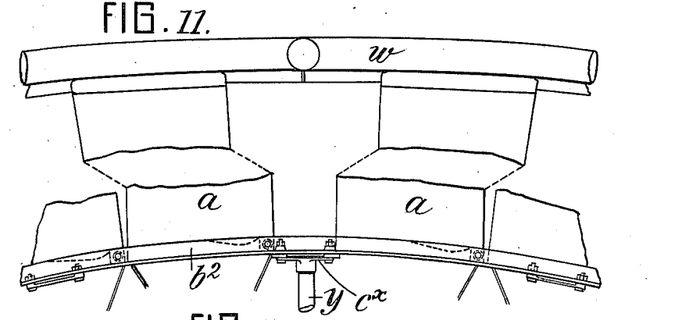
Figure 12:
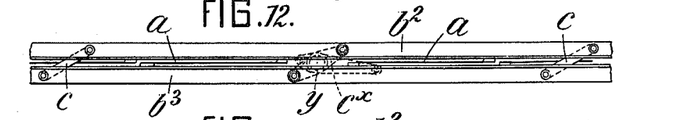
Figure 13:
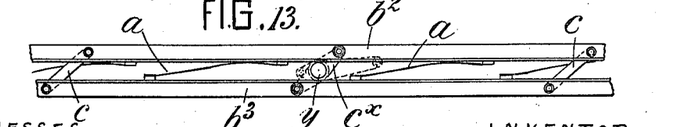
Figure 14:
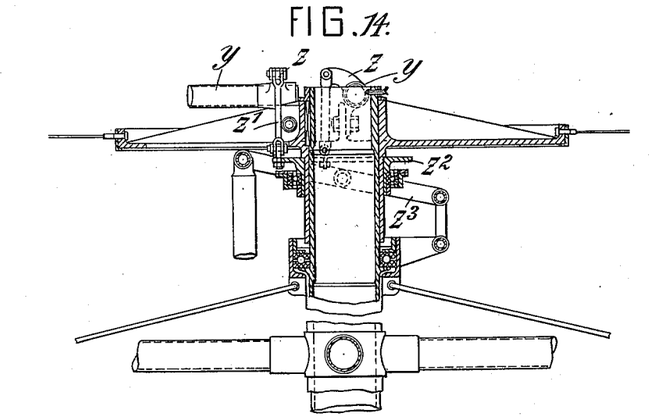
Fig. 14 shows in an enlarged detail sectional view the top part of the double fan shaft with the hub arrangement and adjusting means for operating the device as shown in Figs. 11–13.
Figure 15:
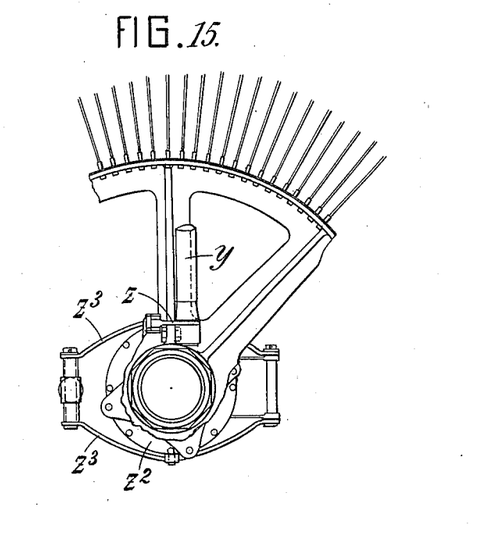
Fig. 15 is a partial plan of the construction according to Fig. 14.

While in the foregoing examples, the curvature of the blades has been described as effected at the periphery by the movement of the rings of the double rim, the blades may be secured to a single outer rim and subjected to a torsional effect at the inner ends where they are joined to the hub by radial spokes. This arrangement is shown in Figs. 11, 12 and 13, and the device for adjusting is further illustrated in Figs. 14 and 15. As shown in Fig. 11, the outer extremities of the blades $a$ are fixed to the solid or tubular outer rim $w$ and the inner extremities are alternately joined with their corners to the parts $b^2$ $b^3$ of the inner or hub rim formed as double or twin rim in this case. The torsional effect is attained in the same way as hereinbefore described, the parts $b^2$ $b^3$ being connected together by links $c$. A number of these links designated $c^x$ are connected with radial tubes or rods $y$ forming the transmitting members for the adjusting movement, which is derived from a crank mechanism $z$ arranged near the center of the hub as shown in Figs. 14 and 15. The crank arms $z$ are connected by means of links $z'$ with a slidable collar $z^2$ so that the latter adjusting parts controls the simultaneous movement of all the links $c^x$ and thus operates as an adjusting device.

In Figs. 14 and 15, the lever or yoke, which controls the collar $z^2$, is designated $z^3$, and it is obvious that it corresponds in its function to the aforementioned operative lever 7, as shown in Fig. 3.

Modifications of my above described propellers can be made. For instance, the blades may return from their fullest pitch angle to a normal resting attitude of a small minimum angle with more or less of a curve as desired, that is to say, a very slight arching or bowing of their front edges. Also propellers may be made after the same light wheel-like construction with inclined blades strongly held in tension and in constant curvature by the peripheral rims where the points of fixture are at an unalterable distance apart. Instead of the double rim, as previously described, a tubular rim may be employed and a sliding member having inclined guiding grooves in which the tips of the blades are positively adjusted while the opposite tips are secured to the said tubular rim.

Figure 4:
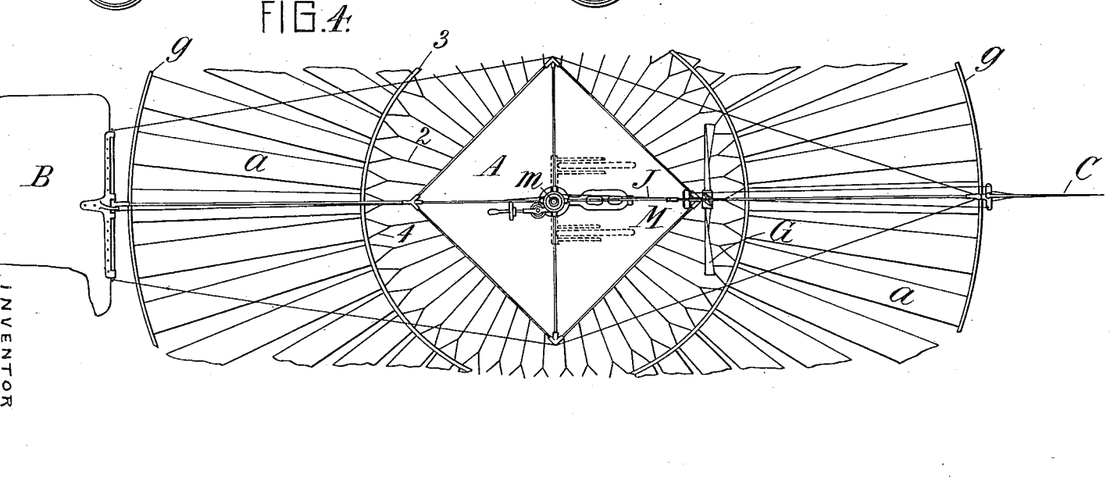
Fig. 4 is a partial plan view of Fig. 3, showing adjusting and steering means.

Reverting to the construction of the aerial machine shown in Figs. 3 and 4, the two fans $g$ $g'$ are driven in opposite directions by a motor M. Now if the fans were revolved in opposite directions under equal conditions of inertia and speed, the gyroscopic effect of one fan would counteract that of the other; nevertheless some amount of gyroscopic benefit may be preserved for such an arrangement either by revolving one helicoplane at a higher speed than the other, or by constructing one of greater weight (or larger dimensions) than the other. In such cases, of course, a difference in one way, say for example, in speed of rotation, would be accompanied by a suitable difference in other ways, say, in degree of pitch incline of blades so as to obviate a spinning around or waltzing movement of the platform of the car. The pair of fans can thus be utilized as biplanar revolving aeroplanes. They also tend to retain the equilibrium position owing to the balancing effects being exerted on either fan regardless of the direction of the arising forces.

The frame of the aerial machine A comprising the driver's platform and rigidly secured to the pillar $m$ is arranged between the upper fan $g$ and the lower fan $g'$. At the center of the latter, a trailing wheel D may be provided and a corresponding supporting wheel D' may also be provided in front on the frame. A light suitable fabric stretched over the central part of the horizontal propeller will enhance its value as a parachute. Furthermore, the aerial machine can be supplemented by auxiliary aeroplanes arranged on the frame either laterally in front of or behind the same. The motor M provides driving power not only for the two superposed fans $g$ $g'$ but also for one or more transport propellers, such as G in Figs. 3 and 4. The leveling rudder in the example shown is designated B, and the vertical rudder C serves for steering in the usual manner. The rod J, Fig. 3, feathers and sets the blades of the transport propeller G.

My improved construction of screw propellers working in air consists in giving all kinds of blades (other than the flexible blades made of thin plate or the like, already described above) a slight hollow or upward curvature (called the Lilienthal curve) on the underside along the leading edge preceding the middle and rear parts, whether the blades are single blades, each at the extremity of a stiff strong arm, or whether they are a numerous spoke-like arrangement of fanlike blades supported at their extremities by a rim or circumferential supports.

Hitherto the Lilienthal curve has only been applied to modify the flatness of rectangular aeroplanes. Now in my construction of screw propellers working in air, every blade is so shaped that it becomes practically a properly working small aeroplane. The shape of the blade (Figs. 18, 19 and 20) is that which according to the analogy of the aeroplane profile shows the curvature according to the known Lilienthal curve. The part of the surface where the positive effect takes place is designated 2 (Figs. 18, 19, 20) and the stream of air entering underneath and passing the cavity $b$ is rapidly deflected along the said surface 2 giving rise to the ordinary upward momentum. The peculiarity however consists essentially in the fact that the convex sloping part $a'$ (opposite the Lilienthal cavity proper) of the curvature forms a negatively acting deflecting surface. As this deflecting surface makes a more or less acute angle of incidence with the plane of the propeller, the stream of air approaching from the edge will be so deflected in the tangential direction with an acceleration that a partial vacuum arises within the range of the negative convex bow, whereby the suction action results in an upward and forward direction. In other words, the stream of air approaching the front edge and deflected by the bow causes a partial vacuum and this greatly assists the effect produced on the underside of the blade in a positive sense by the stream of air passing along the surface 2. It has been proved in practice that the top curvature might advantageously be more prominent than shown in Figs. 18, 19 and 20.

Figure 19:
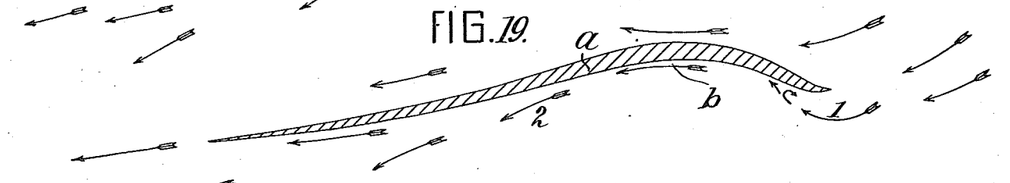
Figs. 19 and 20 are similar views showing modified forms of the propeller.

Fig. 19 shows a beak form of the advancing edge. Such a cutting edge may sometimes be advantageously formed at the front of the blade, otherwise it is known that when the front end is obtuse, a so-called air-wedge or core is formed from the impinging air, thus dispensing with, and having the effect of, the said beak extension.

Figure 20:
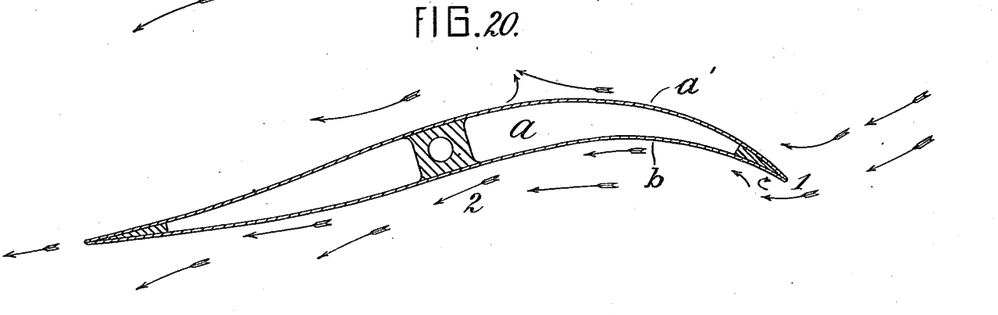

Fig. 20 shows how the blade may be composed of two walls and formed as a hollow resistible body. The bow $a'$ in this case slopes more or less angularly toward the front edge and the Lilienthal cavity $b$ may be comparatively shallow.

The propeller if formed according to the novel configuration (Figs. 18, 19 20) is endowed with great efficiency and is applicable both as a lifting propeller (turning around a vertical axis as is assumed in Figs. 18, 19, 20) and as an ordinary transport propeller.

Figure 18:
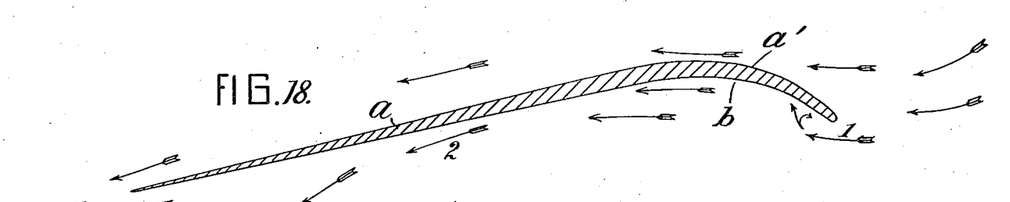
Fig. 18 is a sectional view of a propeller.

In all three representations the slight underneath hollow (called the Lilienthal curve) is shown somewhat exaggerated for the sake of clearness of comprehension of its position and nature.

A peculiar steering mechanism is provided for the purpose of keeping the axial direction of the aerial machine in the desired position and especially when in the event of changing the course—on shifting the rudder C to the right or left—the apparatus would tend to tilt on one side owing to the different speed on one and the other side of the two fans. The steering mechanism as shown in detail in Figs. 16 and 17 allows of an appropriate adjustment by means of a lever $h$ on which a steering wheel $s$ with right-handed and left-handed screw threaded pins $s'$ $s^2$ is mounted and acts after the manner of an adjusting shackle. The nuts $n'$ $n^2$ belonging thereto are prevented from turning independently by means of guides $o'$ $o^2$ and connected with the adjusting rods $e'$ and $e^2$ in such a manner that the adjusting and pulling members $e$ respectively of the upper and lower fans may be simultaneously operated therefrom. When the steering wheel is turned, the vanes of both fans open and close simultaneously and in the same direction. If however the lever $h$, which is correspondingly guided on a toothed rim, is adjusted for upward or downward motion, the opening of the vanes toward the horizontal plane will be diminished for the one fan, whereas the opening for the other fan will be increased. Owing to the opposite rotation of both fans, the lifting action on one side is decreased and that on the opposite side (inner side of the curve) is increased, which causes a steering of the aerial machine without an inclination of the propeller axis. The steering lever $h$, as indicated in Figs. 16 and 17, may also be connected to the steering wheel $t$, which controls by means of a wire connection $p$ $q$ the rudder C, so that the movements of the said rudder and the alternate adjustment of both groups of vanes correspond with one another and are effected by one steering manipulation. Of course, by an independent turning of the steering wheel $t$ (without shifting the lever $h$) the rudder C is controlled independently. An auxiliary substructure in connection with a frame may serve as means for obviating the sagging and the damage which would arise when the fans are made of wide dimensions.

It is obvious that the described propeller fan is operatable either as a parachute or aeroplane wheel having gyrostatic effects, when the blades are lying flat, or as a lifting propeller at will. The blades themselves are enabled to beat against air with reduced loss of energy as compared with those arrangements of fans where the air is cut and churned by the projecting tension rods, wires and stays.

Having now particularly described and ascertained the nature of my said invention and in what manner the same is to be per-formed, I declare that what I claim and wish to secure by Letters Patent is:—

1. In an aerial machine, the combination of a fan constructed with a wheel-like hub, with an outer rim and with tensioning flexible blades, one of the rims being composed of two parts adjustable to each other and connected with the tips of the blades in such a manner that the set of front tips are attached to the one part and the set of rear tips are attached to the other part and means for adjusting the said two-part rim in order to vary the inclination of the blades by distorting the same, substantially as described and shown.

2. In an aerial machine, the combination of a fan constructed with a wheel-like hub, with an outer rim and with tensioning flexible blades, one of the rims being composed of two parts adjustable to each other and connected with the tips of the blades in such a manner that the set of front tips are attached to the one part and the set of rear tips are attached to the other part, and means for adjusting the two-part rim and the blades in the way of distortion in such a manner that when increasing the inclination of the blade or distorting from the flat position, a curvature is provided forming an arch along the fore part of the blade, substantially as described and shown.

3. In an aerial machine, the combination of a fan constructed with a wheel-like hub, with an outer rim and an inner rim and with tensioning flexible blades, one of the rims being composed of two parts adjustable to each other and connected with the tips of the blades in such a manner that the set of front tips are attached to the one part and the set of rear tips are attached to the other part, and means for adjusting the two-part rim and distorting the blades, said means consisting of links for connecting the two parts of the rim and of levers for shifting the same apart, which levers are operated by means of transmitting mechanism such as cords guided over pulleys to a shifting device at the center of the hub, substantially as described and shown.

4. In an aerial machine, the combination of a fan constructed with a wheel-like hub, with an outer rim and with tensioning flexible blades, one of the said rims being composed of two parts adjustable to each other and connected with the tips of the blades in such a manner that the set of front tips are attached to the one part and the set of rear tips are attached to the other and means for adjusting the two-part rim and distorting the blades, said means consisting of links for connecting the two parts of the rim and of levers for shifting the same apart, which levers are operated by means of transmitting mechanism consisting of crank shafts actuated at the hub center by a shifting device, substantially as described and shown.

5. In an aerial machine having two upwardly driven fans each comprising a wheel-like hub, an outer rim an inner rim and adjustable blades between the inner rim and outer rim, the combination with a controlling and steering gear for simultaneously adjusting the two sets of blades and correspondingly adjusting the steering rudder, the connection of the gear being provided for by a shifting lever combined with a double-operating shackle for transmitting the blade adjusting movement and by a steering wheel for transmitting the adjustment of the rudder, substantially as described.

In testimony whereof I have signed my name to this specification in the presence of two subscribing witnesses.

CHRISTIAN LORENZEN.

Witnesses:
CARL R. LOOP,
H. D. JAMESON.